United States Patent [19]

Elsby et al.

[11] Patent Number: 4,710,267

[45] Date of Patent: Dec. 1, 1987

[54] PROCESS FOR REDUCING DISCOLORATION AND/OR TACKINESS IN PROCESSING WASTE PAPER FIBERS

[75] Inventors: Leif Elsby; Agneta Carlsson, both of Stenungsund, Sweden

[73] Assignee: Berol Kemi AB, Stenungsund, Sweden

[21] Appl. No.: 713,516

[22] Filed: Mar. 19, 1985

[30] Foreign Application Priority Data

Mar. 19, 1984 [SE] Sweden ................................ 8401498

[51] Int. Cl.$^4$ ................................................ D21C 5/02
[52] U.S. Cl. ........................................... 162/5; 162/8
[58] Field of Search ......................... 162/5, 8, 72, 158

[56] References Cited

U.S. PATENT DOCUMENTS

| | | | |
|---|---|---|---|
| 3,790,606 | 2/1974 | Sellet | 162/158 |
| 4,144,122 | 3/1979 | Emanuelsson et al. | 162/158 |
| 4,264,412 | 4/1981 | Hasler et al. | 162/5 |
| 4,476,323 | 10/1984 | Hellsten et al. | 162/158 |
| 4,483,741 | 11/1984 | Maloney et al. | 162/5 |

FOREIGN PATENT DOCUMENTS

| | | | |
|---|---|---|---|
| 13758 | 8/1980 | European Pat. Off. | 162/5 |
| 57-29691 | 2/1982 | Japan. | |
| 57-25489 | 2/1982 | Japan. | |
| 42991 | 5/1982 | Japan. | |
| 150191 | 8/1984 | Japan | 162/5 |
| 926129 | 5/1982 | U.S.S.R. | 162/4 |

*Primary Examiner*—S. Leon Bashore
*Assistant Examiner*—K. M. Hastings

[57] ABSTRACT

Waste paper fibers containing tacky impurities processed for the preparation of recycle paper fiber products in the presence of a surface-active tertiary amine or tertiary or quaternary ammonium compound, thereby reducing discoloration and tackiness.

8 Claims, No Drawings

PROCESS FOR REDUCING DISCOLORATION AND/OR TACKINESS IN PROCESSING WASTE PAPER FIBERS

When waste paper pulp fibers are used for the production of recycle paper products, such as tissue, newspaper, sheet, cardboard, hardboard, and cartons, difficulties arise, due to the presence in the fiber suspension of impurities that discolor the pulp (and the waste paper product) or make the pulp (and product) tacky. Tacky impurities in waste paper usually originate from adhesives or coating materials, such as styrene-butadiene latex polymers, derived from self-adherent labels and envelopes, tapes, sizing and binding agents in coated paper, and similar paper-treating materials that are present in waste paper. Discoloring impurities usually originate from the printing inks used in the production of printed products, such as newsprint, magazines, packing materials, computer lists, and printed forms.

These impurities lead to production problems. The discoloring and/or tacky impurities may stick to the wires and felts of paper machines, increasing production costs, since the paper machines must be frequently shut down for cleaning. During sheet formation on a Fourdrinier paper machine, discoloring and/or tacky impurities tend to agglomerate on the upper side of the newly-formed paper web, and consequently stick to the felts in the subsequent press section. On a twin wire machine, these impurities to a great extent stick to the wires. Discoloring and/or tacky impurities are also deposited on other parts of the paper machines, i.e. on rolls and suction boxes, and naturally, also on the formed and dried fiber product. Discoloring and/or tacky impurities in the dried paper also lead to problems in subsequent coating, printing, cutting, rolling, stacking and similar working procedures. Moreover, the impurities cause stains, which apart from possible technical problems are also deleterious to the finish of the fiber product.

Japanese patent application No. 82/29,691 discloses that tacky impurities can be removed by washing the waste paper fiber suspension using a higher alkylamine-ethylene oxide adduct. Japanese patent application No. 82/25,489 suggests removing discoloring impurities in waste paper by washing with an alkylamine-ethylene oxide-propylene oxide adduct composition. These compounds are however expensive to produce, and at the same time display a limited ability to remove such impurities. When they contain saturated, long alkyl chains, their physical properties are unsuitable.

Alkylphenol-ethylene oxide adducts and soaps are often used for deinking waste paper, but these also have a limited effect.

In accordance with the present invention, the processability of waste paper fibers in the wet section and press section of paper machines is improved by processing the fibers in the presence of a surface-active tertiary amine or quaternary ammonium compound, which among other things so affects the tackiness of impurities derived from the waste paper that the adhesion thereof to the machine wires and felts is reduced. The reduction in the adhesion is noted for polymeric adhesives as a class, including polyestyrene, butadiene, polyacrylamide, polyvinyl acetate, polyvinyl alcohol, natural latex, and modifications thereof. Moreover, the amount of discoloring and tacky impurities is reduced, as well as the tendency of such impurities to agglomerate, and form stains.

The invention accordingly provides a process for reducing discoloration and tackiness in the processing of waste paper fibers for the preparation of recycle paper fiber products, which comprises processing the waste paper fibers as an aqueous pulp suspension in the presence of a small effective amount of a surface-active tertiary amine or tertiary or quaternary ammonium compound having the formula

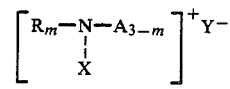  I in which:
the groups X and Y are present only when N is tetravalent;
A is selected from the group consisting of
  (i) alkyl having from one to about four carbon atoms; and
  (ii) $B_pH$ where B is an alkyleneoxy group derived from an alkylene oxide having from two to four carbon atoms or mixture thereof, at least 50% and preferably at least 80% of the alkyleneoxy groups being ethyleneoxy groups;
p is an average number representing the number of alkyleneoxy groups within the range from 1 to 30; m is a number from 1 to 3;
X is selected from the group consisting of hydrogen; alkyl having from 1 to 2 carbon atoms; and hydroxyalkyl having from two to four carbon atoms;
Y is an anion (including $OH^-$ and salt-forming anions derived from inorganic and organic acids), preferably monovalent;
R is selected from the group consisting of:

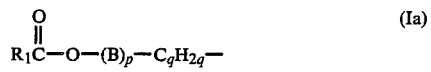  (Ia)

where:
$R_1$ is hydrocarbon having from about nine to about twenty-three carbon atoms;
q is a number from 2 to 4;
B and p are as above;

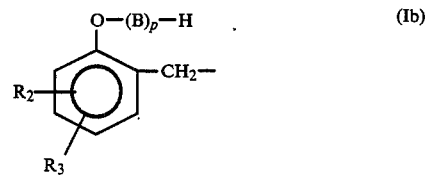  (Ib)

where:
B and p are as above;
$R_2$ and $R_3$ are selected from the group consisting of hydrogen; alkyl having from one to about eighteen carbon atoms; and groups having the formula:

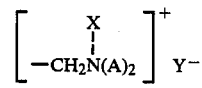

where:

X and Y are present only when the nitrogen is tetravalent;

A, X and Y are as above; and

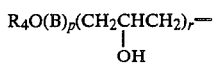

where:
$R_4$ is hydrocarbon having from about ten to about thirty-five carbon atoms;
r is a number from 1 to 3; and
B and p are as above.

It will be apparent that when X and Y are absent the compound is a tertiary amine, and when X and Y are present, the compound is a tertiary or quaternary ammonium compound, base or salt. The tertiary ammonium compound base is a tertiary amine.

The added amount of the amine or ammonium compound is not critical, but is normally within the range from about 0.05 to about 2%, preferably from 0.1 to 1%, by weight of the dry paper fibers. The point of addition is not critical, but the addition must of course be made before processing is complete, i.e., before sheet formation, or, in case deinking is required, at the latest, during flotation or washing of the pulp.

If the tacky compounds are to be made harmless, the addition can be made during pulping of the waste paper, or, preferably, to the pulp suspension suitable for sheet formation. If deinking of the pulp is desired, the compound should be added during pulping of the waste paper. The suspension obtained is then suitably subjected to froth flotation or washing.

Especially suitable tertiary amines and tertiary and quaternary ammonium compounds contain an acyl group, and have the general formula:

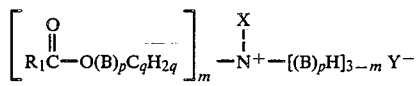

where:
$R_1$, B, X, Y, m, p and q are as above.

Examples of suitable compounds in this class are triethanolamine esters of mono-, di-, or tri-fatty acids with from about 5 to about 25 moles of ethylene oxide per mole of triethanolamine.

Suitably, the number of ethylenoxy groups increases with the number of esterified groups.

Another group of preferred tertiary amines and tertiary and quaternary ammonium compounds has the formula:

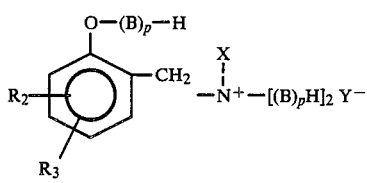

where:
B, X, Y and p are as above; and
$R_2$ and $R_3$ are selected from the group consisting of alkyl having from one to about eighteen carbon atoms; and $CH_2-N(B_pH)_2$, where B and p are as above.

Especially suitable compounds of this class are those obtained when substituted phenols, such as butyl phenol, dibutyl phenol, octyl phenol, dioctyl phenol, nonyl phenol, and dinonyl phenol, are reacted by a Mannich reaction with formaldehyde or paraformaldehyde and ammonia or a primary amine or preferably a secondary amine in the form of dialkanolamine in approximately equimolar amounts so that a compound with at least one nitrogen atom in the molecule is formed. The obtained Mannich compound is then alkoxylated, preferably with from about 7 to about 30 moles of ethylene oxide per mole of phenol.

A further group of suitable tertiary amines and tertiary and quaternary ammonium compounds has the general formula:

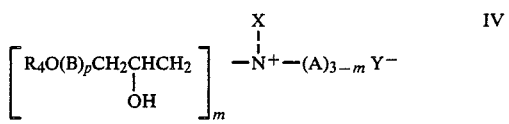

where:
$R_4$, B, A, X, Y, p and m are as above.

Preferably, m is 2, and A is methyl. These compounds can easily be produced by reacting an optionally alkoxylated, preferably ethoxylated alcohol, or substituted phenol with epichlorhydrin. The resulting glycidyl compound can be reacted with ammonia or a primary amine, with subsequent alkylation or preferably with a secondary amine. If desired, the resulting tertiary amine can be quaternized in known manner.

Besides the tertiary amine or tertiary or quaternary ammonium compound, other additives commonly used in the process of waste paper can be added, if these additives do not interfere with the tertiary amine or tertiary or quaternary ammonium compound. Such additives include complexing agents, defoamers, pH-regulators, bleaching agents and bactericides.

The following Examples represent preferred embodiments of the invention. All percentages are by weight, unless otherwise indicated.

EXAMPLE 1

Waste paper composed of 70% newspaper and 30% magazine paper as well as one self-adhering label with butadiene-latex polymer adhesive was pulped in a laboratory pulper for 30 minutes at 40° C. and a 6% pulp concentration in the presence of 1% sodium metasilicate, 1% hydrogen peroxide and 0.3% of a surface-active compound, all by weight of the waste paper. In Example 1, the surface-active compound was the adduct of diethanolaminomethyldinonyl phenol with 12 moles of ethylene oxide per mole of phenol, quaternized with dimethyl sulphate. In the Control, the adduct of nonyl phenol with 10 moles of ethylene oxide per mole of phenol was used.

After pulping, the pulp suspension was left to stand for 30 minutes at 40° C. Then it was diluted with water to a pulp concentration of 1%, and dewatered to a pulp concentration of 10% on a filter. The dilution and dewatering were repeated twice. The amount of tacky impurities and the amount of discoloring compounds in the cleaned pulp was then determined. The foaming of the water from the first dewatering step was also determined in a conventional apparatus.

The amount of tacky impurities was determined by screening the pulp through a vibrating screen with 0.3 mm slots. The tacky impurities were removed from the screen by hand, and weighed. The tackiness of the tacky impurities was calculated by using the formula $A=(X/B-1)\cdot 100$, where A denotes the tackiness in percentage, B denotes the amount of tacky impurities if pulping is performed without surface active agents, and the pulp washed directly on a vibrating screen, and X denotes the amount of tacky materials when pulping is performed in the presence of the surface active agent being tested, after washing and screening. The higher the value of A, the larger the agglomeration tendency for the tacky impurities.

The amount of discoloring compounds was determined by forming the pulp to sheets. Thereafter the brightness of the dried sheet was determined with an Elrepho apparatus at 457 mm according to ISO-standards. The following results were obtained:

TABLE I

|  | Example 1 | Control |
|---|---|---|
| Tackiness, A | 16.2 | 42.6 |
| Brightness after dewatering, % of the standard reference | 57.6 | 55.6 |
| Foaming, mm | 4 | 20 |

From the results it is evident that the pulp produced according to the invention has less tackiness and higher brightness than the pulp produced according to the prior art. Besides, the water from the first dewatering step in the process according to the invention shows very low foaming.

EXAMPLES 2 TO 12

The effect of a number of surfactants on the adhesion property of an additive of styrene-butadiene type was tested in the following manner. A self-adhering label of the same type as in Example 1 was placed in a water solution containing 100 ppm of the surfactant to be investigated. After 1 minute the label was placed on a plastic wire. After 1 minute the label and wire were carefully separated, and the resistance to separation determined as a subjective measure of the adhesion, according to the scale:
1. strong adhesion
2. moderate adhesion
3. weak adhesion For most of the surface active compounds also their effect on the tackiness of the additive was determined using the test method of Example 1. The following results were obtained:

TABLE II

| Example No. | Test Compound | Adhesion | Tackiness |
|---|---|---|---|
| 2 | Adduct of diethanolaminomethyl-dinonylphenol with 12 moles ethylene oxide | 2 | 22.6 |
| 3 | Bis-(dinonylphenoxy-[CH$_2$CH$_2$O]$_{10}$ CH$_2$CH(OH)CH$_2$)—dimethyl ammonium chloride | 2 | 18.4 |
| 4 | Bis(C$_{10-14}$—alkyl-OCH$_2$CHOHCH$_2$) dimethyl ammonium chloride | 2 |  |
| 5 | The adduct of diethanolaminomethyl-dinonylphenol with 12 moles ethylene oxide (the compound of Example 1) | 3 | 16.2 |
| 6 | Adduct of dicoco fatty acid ester of triethanolamine with 20 moles ethylene oxide | 3 |  |
| 7 | Adduct of monococo fatty acid ester of triethanolamine with 15 moles ethylene oxide | 3 |  |
| 8 | Adduct of trioleic acid ester of triethanolamine with 20 moles ethylene oxide | 3 |  |
| 9 | Adduct of dioleic acid ester of triethanolamine with 15 moles ethylene oxide | 3 | 16.4 |
| 10 | Adduct of monooleic acid ester of triethanolamine with 10 moles ethylene oxide | 3 | 17.4 |
| 11 | 50% each of adduct of monooleic acid ester of triethanolamine with 12 moles ethylene oxide (the compound of Example 10) and the adduct of diethanolaminomethyl-dinonylphenol with 12 moles ethylene oxide (the compound of Example 1) | 3 |  |
| 12 | Adduct of dioleic acid ester of triethanolamine with 12 moles ethylene oxide and 3 moles propylene oxide (randomly reacted) | 3 | 16.6 |
| Comparison | | | |
| Control A | No additive | 1 | 41.9 |
| Control B | Adduct of oleylamine with 5 moles ethylene oxide and 2 moles propylene oxide (randomly reacted) | 1 | 32.4 |
| Control C | Na—oleate/stearate | 1 | 42.3 |
| Control D | Adduct of nonylphenol with 10 moles ethylene oxide | 1 | 42.6 |
| Control E | Adduct of coco fatty amine with 15 moles ethylene oxide | 1 | 28.9 |
| Control F | Adduct of coco fatty amine with 10 moles ethylene oxide quaternized with dimethyl sulphate | 1 | 29.2 |

From the results for the Controls A to F, it is evident that the compounds of Examples 2 to 12 added in the method according to the invention considerably reduce the tackiness caused by the presence of self-adhering labels.

EXAMPLES 13 TO 15

The composition of Example 11 was tested in the same manner as in Examples 1 to 12 for adhesion to plastic wire, but with the difference that the adhesive was based on polyvinyl acetate, polyvinyl alcohol or polyacrylamide. For all the adhesives, the adhesion value was 3, a weak adhesion.

Having regard to the foregoing disclosure the following is claimed as the inventive and patentable embodiments thereof:

1. A process for reducing discoloration and tackiness in the processing of waste paper fibers which contain tacky impurities for the preparation of recycle paper fiber products, which comprises adding during processing the waste paper fibers which contain tacky impurities as an aqueous pulp suspension an amount effective to reduce discoloration and tackiness of a surface-active tertiary amine or tertiary or quaternary ammonium compound having the formula:

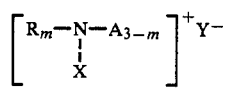

I in which:

the groups X and Y are present only when N is tetravalent;

A is selected from the group consisting of
(i) alkyl having from one to about four carbon atoms; and
(ii) $B_pH$ where B is an alkyleneoxy group derived from an alkylene oxide having from two to four carbon atoms or mixtures thereof, at least 50% of the alkyleneoxy groups being the ethyleneoxy groups;

p is an average number representing the number of alkyleneoxy groups within the range from 1 to 30; m is a number from 1 to 3;

X is selected from the group consisting of hydrogen, alkyl having from 1 to 2 carbon atoms, and hydroxyalkyl having from two to four carbon atoms;

Y is an anion;

R is selected from the group consisting of:

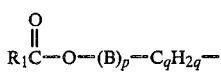  (Ia)

where:
$R_1$ is hydrocarbon having from about nine to about twenty-three carbon atoms;
q is a number from 2 to 4;
B and p are as above;

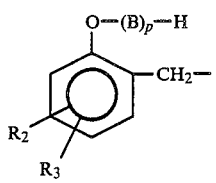  (Ib)

where:
B and p are as above;
$R_2$ and $R_3$ are selected from the group consisting of hydrogen and alkyl having from one to about eighteen carbon atoms; and groups having the formula:

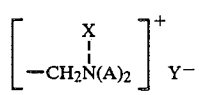

where:
X and Y are present only when the nitrogen is tetravalent; and
A, X and Y are as above;

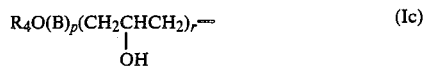  (Ic)

where:
$R_4$ is hydrocarbon having from about ten to about thirty-five carbon atoms;
r is a number from 1 to 3; and
B and p are as above.

2. A process according to claim 1 in which the compound has the formula:

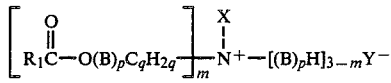

where:
$R_1$, B, X, Y, m, p and q are as in claim 1.

3. A process according to claim 1 in which the compound has the formula:

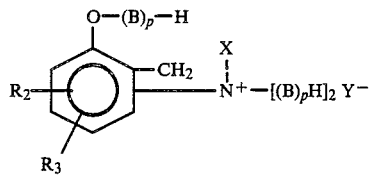

where:
B, X, Y and p are as in claim 1, and $R_2$ and $R_3$ are alkyl having from one to about eighteen carbon atoms selected from the group consisting of $CH_2$—$N(B_pH)_2$, where B and p are as in claim 1.

4. A process according to claim 1 in which the compound has the formula:

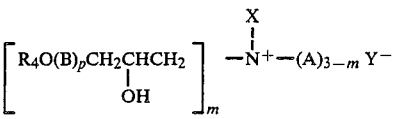

where:
$R_4$, B, A, X, Y, m and p are as in claim 1.

5. A process according to claim 4 in which m is 2 and A is methyl.

6. A process according to claim 1 in which the compound is added in an amount within the range from about 0.05 to about 2% by weight of the dry waste fibers.

7. A process according to claim 1 in which the compound is added in an amount within the range from about 0.1 to about 1% by weight of the dry waste fibers.

8. A process according to claim 1 in which the compound is added to the pulp after deinking but before sheet formation.

* * * * *